T. W. MILLER.
PROCESS OF MANUFACTURING SEAMLESS RUBBER GLOVES.
APPLICATION FILED JUNE 11, 1915.
1,165,198.
Patented Dec. 21, 1915.
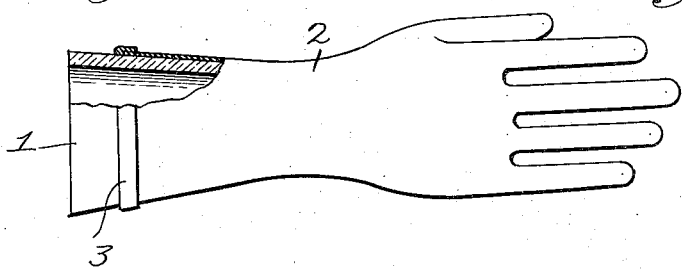
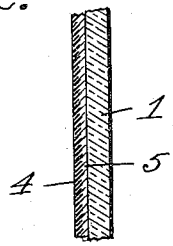
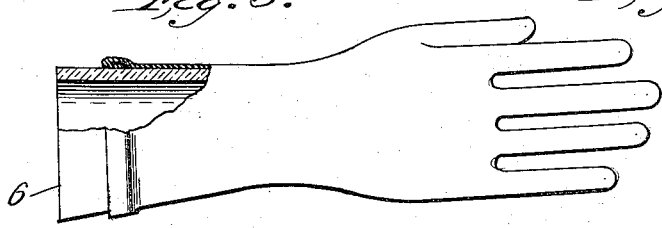
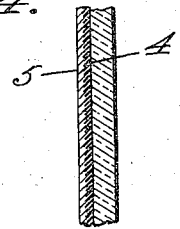
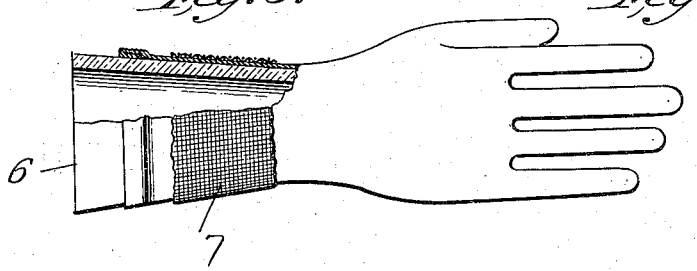
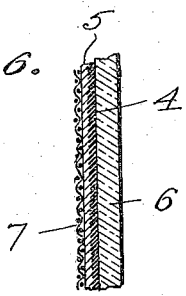
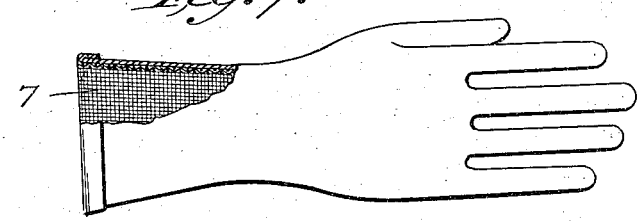
Witness
Edwin L. Jewell
Inventor
Thomas W. Miller
by Percy B. Hills
Attorney

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

PROCESS OF MANUFACTURING SEAMLESS RUBBER GLOVES.

1,165,198. Specification of Letters Patent. Patented Dec. 21, 1915.

Application filed June 11, 1915. Serial No. 33,506.

*To all whom it may concern:*

Be it known that I, THOMAS W. MILLER, a citizen of the United States, residing at Ashland, in the county of Ashland and State of Ohio, have invented certain new and useful Improvements in Processes of Manufacturing Seamless Rubber Gloves, of which the following is a specification.

My invention relates to seamless rubber gloves, and has for its object to provide certain improvements in the method of manufacturing the same, as will be hereinafter more definitely pointed out and claimed.

More specifically, my invention relates to the production of a glove of this character having its inner surface, in whole or in part, provided with a lining of textile material, such as stockinette, and in which the curing process firmly unites said textile material to the rubber body.

In the accompanying drawing:—Figure 1 is an elevation of an ordinary form used in the manufacture of seamless rubber gloves, a glove being shown formed thereon, and the two being partly broken away. Fig. 2 is an enlarged fragmentary sectional view of the said form and glove, the latter being shown partially vulcanized on the outer surface. Fig. 3 is a view similar to Fig. 1, showing the glove applied reversed on a form. Fig. 4 is a view similar to Fig. 2 of the form and glove shown in Fig. 3. Fig. 5 is a view similar to Fig. 3 with textile material applied to the surface of the glove. Fig. 6 is a view similar to Fig. 4 of the form and glove shown in Fig. 5. Fig. 7 is a view partly in section of the completed glove.

In the said drawing, the reference numeral 1 denotes the ordinary form used in the manufacture of seamless rubber gloves, said gloves being formed in the usual manner by dipping the form into a rubber solution to apply a plurality of coatings of rubber thereto. Said rubber glove so formed by the dipping process is indicated by the reference numeral 2, and the same has the usual finishing edge 3 formed thereon, either by rolling the rubber back upon itself, or by applying thereto a strip of rubber to form a bead, or in any other suitable manner, as may be desired. The complete rubber glove so formed is then cured by the well known acid or vapor cure, which I will term a "cold cure", and which results in the glove being vulcanized on its outer surface, as indicated at 4 in Fig. 2, and practically unvulcanized on its inner surface, as indicated at 5 in said figure, the sulfur of the solution not completely penetratiing the rubber. The glove so partially vulcanized is then stripped from the form 1 and applied to said form or to a similar form 6 turned inside out, bringing the substantially unvulcanized surface 5 of the glove upon the exterior, as shown in Figs. 3 and 4. To this substantially uncured surface of glove the textile material 7 is applied, the rubber being more or less sticky causing the same to adhere thereto, and the glove with the textile material so applied may then be vulcanized on that surface by the acid or vapor cure, which will effect a homogeneous union between the rubber and textile material. Or the textile material may be applied thereto with a self-curing cement, which will unite the same to the rubber glove, and will obviate the necessity for the second cure. The completed glove is then stripped from the form 6 and reversed and will present the appearance disclosed in Fig. 7.

The glove may be provided with a lining of fabric 7 throughout its entire area, though it will be understood that portions only of the glove may be so lined, for instance, the wrist portion may be lined, and the fingers and thumb at the crotch provided with lining pieces, and the tips of the fingers may also be so lined. In fact I do not wish to limit myself in any particular as to the area of the surface to be lined, as said lining may extend over the entire surface or any part thereof.

Having thus described my invention, what I claim as new and desire to secure by Letters Patent, is:—

1. The method of making seamless rubber gloves, which consists in forming the same upon a form by dipping, then vulcanizing the same in such manner that the inner surface thereof is cured less than the outer surface, then reversing the same upon a form, then securing thereto a layer of fabric, and finally again reversing said glove to bring the fabric inside.

2. The method of making seamless rubber gloves, which consists in forming the same upon a form by dipping, then vulcanizing the same in such manner that the inner surface thereof is cured less than the outer surface, then reversing the same upon a form, then applying thereto a layer of fabric, then vulcanizing said fabric to said glove, and finally again reversing said glove to bring the fabric inside.

3. The method of making seamless rubber gloves, which consists in forming the same upon a form by dipping, then cold curing the same from the exterior surface inward, then reversing the same upon the form, then applying thereto a layer of fabric, then curing said reversed surface with the fabric applied, and finally again reversing said glove to bring the fabric inside.

In testimony whereof I have hereunto affixed my hand, this 8th day of June, 1915.

THOMAS W. MILLER.